United States Patent [19]

Case, Jr. et al.

[11] 3,815,132

[45] June 4, 1974

[54] RADAR FOR AUTOMATIC TERRAIN AVOIDANCE

[75] Inventors: Robert O. Case, Jr., La Habra; Jerome M. Page, Downey, both of Calif.

[73] Assignee: Rockwell International Corporation, El Segundo, Calif.

[22] Filed: June 3, 1960

[21] Appl. No.: 33,860

[52] U.S. Cl. .................. 343/7 TA, 343/16 M
[51] Int. Cl. ............................................ G01s 9/22
[58] Field of Search ......... 343/16, 7, 5, 7 TA, 16 M

[56] References Cited
UNITED STATES PATENTS

| | | | |
|---|---|---|---|
| 2,687,520 | 8/1954 | Fox | 343/13 |
| 2,809,340 | 10/1957 | Bernhart | 318/566 |
| 2,930,035 | 3/1960 | Altekruse | 343/7 |
| 2,965,894 | 12/1960 | Sweeney | 343/7 |
| 2,994,966 | 8/1961 | Senitsky et al. | 343/5 |
| 3,153,234 | 10/1964 | Begeman et al. | 343/7 TA X |
| 3,212,088 | 10/1965 | Alexander et al. | 343/16 M |
| 3,188,632 | 6/1965 | Jeromson | 343/7 TA X |
| 3,241,141 | 3/1966 | Wall | 343/7 TA X |
| 3,243,813 | 3/1966 | Summers | 343/7 TA X |
| 3,325,807 | 6/1967 | Burns et al. | 343/7 16 M |

*Primary Examiner*—T. H. Tubbesing
*Attorney, Agent, or Firm*—L. Lee Humphries and L. Lee Humphries

[57] ABSTRACT

In an airborne radar having a forward looking antenna directed toward the ground at a relatively small depression angle,
  means including said antenna for generating first and second signals indicative of the range and direction respectively of terrain lying within the beamwidth of the antenna;
  means responsive to said radar for generating a reference signal indicative of a preselected clearance distance, Ho, divided by said range R;
  signal combining means responsive to said second signal and said reference signal for providing a warning signal indicative of the difference therebetween.

9 Claims, 4 Drawing Figures

FIG. 2

RADAR FOR AUTOMATIC TERRAIN AVOIDANCE

This invention relates to a system for enabling an aircraft to avoid terrain obstacles, and particularly concerns apparatus capable of yielding information as to the clearance altitude of an aircraft relative to dangerous terrain elevations. The invention is of particular utility as applied to the automatic control of the elevation profile of low- flying aircraft.

In the utilization of aircraft, particularly military aircraft, there is often a requirement for flight at moderate-to-high speeds at a relatively low height above the terrain (such as between 200 and several thousand feet). This type of operation is dangerous because of possible collision with the terrain.

Studies have shown that under certain conditions penetration of a manned aircraft into hostile territory is safer at extremely low altitude than at very high altitude despite the lower maximum speed. The reason is that the detection and interception by the enemy are much more difficult for a "hedge-hopping" target than for a high altitude target. However, the additional protection afforded by low-level flight would be nullified if some method of positive avoidance of natural obstacles is not provided. The profiloscope system described in a copending application of W. L. Mitchell, Ser. No. 698,893, filed Nov. 29, 1957, for PROFILOSCOPE, now U.S. Pat. No. 3,251,060, does provide positive obstacle warning and is highly useful for low-level flights of relatively short duration. However, other studies have shown that pilot fatigue is a serious problem in high speed, low-level flight because of the extreme bumpiness of the flight. For extended penetration, therefore, automatic tie-in or control of the autopilot is necessary.

In an unmanned vehicle, for the same reason cited above, the weapon would produce a greater strategic effect (i.e., a larger percentage would reach their intended target) if an effective method of low altitude automatic flight control is provided.

Accordingly, it is the object of this invention to provide a relatively simple and reliable device which will examine the terrain along the flight path, will evaluate the relative danger of the various elements of the terrain according to pre-established criteria and which, as a result, will continuously generate elevation steering signals suitable for use by an autopilot such that the vehicle will maintain a suitably low average terrain clearance, without collision, over all types of terrain.

Prior solutions to the problem all suffer from one or more of a number of serious disadvantages. For example, a barometric altimeter has been used in conjunction with an autopilot in order to maintain constant altitude. This has the disadvantage that certain terrain features may extend above the altitude selected. Further a line of constant barometric pressure may not be level.

An absolute altimeter, radar, optical, or sonic may be used in conjunction with an autopilot in order to maintain constant height above the terrain. This has the disadvantage in that there is no warning of the pending obstacles. Further, a steep gradient of the ground below the aircraft may result in the ground altitude changing more rapidly than the aircraft altitude can be changed.

Forward-looking slant ranging radar has been used to measure the slant range to the ground along a line with a fixed angular orientation with respect to the aircraft, the vertical, or the velocity vector. Such a technique is described in a U.S. Pat. No. 2,574,853 to R. Ward, a U.S. Pat. No. 2,225,046 to P. D. Hunter, and in a pending application of William S. Burdic and Robert O. Case, Jr. for SLANT RANGE TRACKING TERRAIN AVOIDANCE SYSTEM, Ser. No. 19,959, filed Apr. 4, 1960, now U.S. Pat. No. 3,739,380. The slant range tracking scheme suffers from several disadvantages. Since its field of view is highly restricted (i.e., it "sees" only the terrain along its axis) it can be fooled by certain types of terrain. Further, in a slant range tracking system, it is necessary to "lock-on" to the terrain, whereby loss of lock-on may introduce serious difficulty.

There has been proposed the somewhat more complex version of the slant range tracking radar which utilizes several beams, each with its own angle rather than a single beam at a fixed angle. This helps the problem of limited vision but at the expense of so much added complexity that it suffers by comparison with the present invention.

A scanning radar has been proposed to measure the instantaneous range along the boresight axis of the antenna, while the antenna is being scanned in elevation. In this way, the ground profile can be traced out ahead of the airplane and the elevation control signal can be derived therefrom. This system has the disadvantage of requiring a scanning antenna with its associated weight and complexity. It has the further disadvantage that as the main beam of the antenna is scanned the side lobes scan also. Under some circumstances there is danger that the side lobes will receive sufficient energy from the nearby terrain to result in erroneous control signal.

The present invention, according to a preferred embodiment thereof, utilizes a range weighted technique involving computation of clearance of all terrain features within a fixed range increment such as, for example, from one to ten miles ahead of the vehicle. The targets are weighted inversely with range. That is, a target twice as far away would have to be twice as high (relative to the flight path) to be considered an equal danger. On this basis the most dangerous obstacle is automatically selected and a pitch rate command derived therefrom.

In the use of this range weighted technique, there is provided a computer which is responsive to a monopulse receiver and produces an angular subtent signal or terrain angle signal which may be defined herein as the angle (angle C of FIG. 1) between two lines, both of which pass through a point which is an adjustable distance directly beneath the airplane. The first line is parallel to a reference direction (such as the aircraft flight path). The second line extends between the aforementioned point and a reflecting portion of the ground. This terrain angle signal is provided for all the points within the antenna beam width and within a predetermined gated interval. The most dangerous obstacle is selected by choosing the maximum value of this terrain angle in a suitable circuit such as a peak detector, which thus provides as its output a signal proportional to the angle subtended by the most dangerous terrain elevation feature within the desired or predetermined range interval. More specifically in accordance with a disclosed embodiment of the invention, there is provided a computer which implicitly or explicitly computes quantitatively the displacement of points on the ground within the antenna beam pattern relative to a clearance plane which is set at a predetermined clearance distance from the radar. The computer includes means for implicitly or explicitly dividing this displacement by the slant range of all such points within the beam pattern to thereby produce a weighted danger signal indicative of the angular subtent of all the points within the gated interval of the beam pattern. In order to select the most dangerous of these points, there is further provided means for detecting the maximum value of this weighted danger signal. This maximum value is utilized to provide a pitch rate command to suitable aircraft elevation control mechanism.

A number of objectives are advantageously achieved by the apparatus constructed according to the principals of this invention.

The apparatus is relatively simple.

The apparatus gives ample warning of an impending obstacle and institutes the corrective action before the obstacle is achieved. There is enjoyed the simplicity of a non-scanning or fixed antenna as well as that of an antenna having fixed side lobes the return from which can be gated out.

In contrast to the slant range tracking scheme, the present apparatus is not required to lock on to the terrain.

The described apparatus is sensitive to all terrain elements within its field of view, not just those along its boresight axis. Therefore, at any given instant of time, the vehicle is being controlled on the basis of the most dangerous obstacle along its flight path. There is no danger of a dangerous obstacle sneaking up on it.

The described apparatus produces a proportional signal for the autopilot. This is a feature of significance from a control system stability standpoint.

The control system of the present apparatus has a constant gain. This feature results from the fact that the error signal to the autopilot represents a pitch error and it calls for a pitch rate to null the error. Thus the control system does not experience undesirable changes of gain as a function of aircraft orientation or ground geometry.

Further, by selecting the most hazardous obstacle within the antenna pattern, the described automatic elevation control system will cause the aircraft to follow a smoother elevation profile with substantially decreased variations in elevation. Thus, the required maneuver will be minimized with a resultant minimum fuel and power consumption obtaining from the relatively smooth flight projectory.

The above and other objects of the invention will become apparent from the following description taken in connection with the accompanying drawings in which.

In the drawings like reference characters refer to like parts.

The described apparatus utilizes a data processing system somewhat analogous to that used in the system described in the co-pending application of W. L. Mitchell, Ser. No. 698,893, for Profiloscope, filed on Nov. 20, 1957, now U.S. Pat. No. 3,251,060. In the Mitchell system, the radar measures explicitly the angle of the terrain with respect to the antenna boresight axis. By combining this angle with the depression angle of the antenna, the total angular displacement relative to the flight path vector is obtained. Multiplying this angle by range yields the vertical linear displacement of the terrain. At all ranges where the displacement is less than the clearance plane setting, the warning signal is produced for display.

In the present system, three additional functions are provided implicitly or explicitly. First, the displacement is obtained quantitatively in order to produce a proportional signal. Secondly, the displacement is weighted inversely with range. In other words, an object 100 feet above the clearance plane at 10 miles, for example, will be considered to be only onehalf as dangerous as an object 100 feet above the clearance plane at 5 miles distance. Thirdly, the video signal is processed to produce a signal proportional only to the most dangerous obstacle, according to the above criteria.

A monopulse radar system is characterized by an antenna having a radiation pattern including a pair of lobes displaced on either side of the antenna boresight axis. Microwave bridging means is provided for comparing the signals received in the two antenna lobes. In one such monopulse system the signals are additively and subtractively combined and fed to a dual channel receiving system which provides a sum signal $E_s$ according to the additively combined energy and a difference or error signal $E_d$ according to the subtractively combined energy. The angle off the boresight axis of the antenna B, in the elevation plane, is determined by the relation between the sum signal and the difference signal in the following form: $E_d = K_1 B E_s$, where $K_1$ is a constant of proportionality. With instantaneous automatic gain control (IAGC) incorporated in the system, the sum signal $E_s$ is a constant so that $E_d = KB$. That is, the difference signal output is a direct measure of B.

Figure 1:
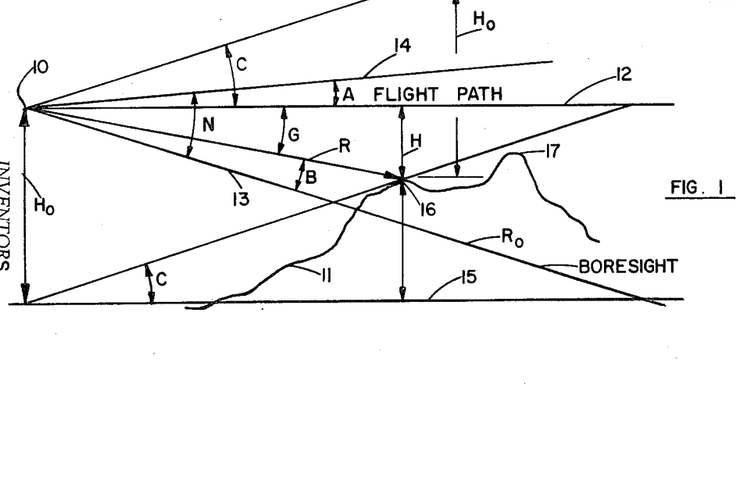
FIG. 1 illustrates the geometry of the problem solved by the disclosed embodiment of this invention.

Referring now, to FIG. 1, a low-flying aircraft at a point indicated at 10 is proceeding along and above the ground indicated at 11, with a flight velocity vector or a flight path indicated at 12, and has an aircraft reference axis such as the aircraft roll axis 14 displaced from the flight path through an angle of attack indicated at A. The boresight axis of the monopulse radar antenna is indicated at 13 and is depressed with respect to the aircraft axis 14 through an angle N, such that it will intercept a clearance plane indicated at 15 at a known or pre-determined range $R_o$ when the clearance plane is positioned at a distance $H_o$ below the flight path 12. The clearance plane 15 is parallel to a plane containing the flight path 12 and a horizontal line which is perpendicular thereto.

It can be seen from the geometry of FIG. 1 that the instantaneous perpendicular distance H from the flight path 12 to an obstacle such as a hill 16 at slant range R can be computed explicitly. An explicit solution for H is possible since the slant range R is proportional to the elapsed time of the video return. The angle B is determined by the difference or error signal of the elevation monopulse antenna, and the angle N is the boresight depression angle below the flight path or other reference line which may be utilized. Since a low altitude configuration is assumed, small angle approximations are appropriate (the angles illustrated will all be 10° or less and generally on the order of 3°). Thus it will be seen from FIG. 1, that $H = R(N \pm B - A)$ where the plus or minus sign is used depending upon the position of the ground return of this target 16 relative to the boresight axis 13 of the antenna.

A system which attempts to solve for H explicitly is beset with difficulties when used as a proportional control system since H is varying at a video rate. This is so because all terrain altitude which is within the effective beam width of the antenna is measured once each transmitted pulse of the radar. A peak detecting system can be used which responds only to an indication of the highest obstacle within the beam width of the antenna, but such an arrangement would impose the difficulty that a short-range obstacle which is dangerous, would be ignored by the system in preference to a higher obstacle at a greater range. Therefore, in addition to determining the value of H at each terrain point within the beam width, it is necessary to weight the height information with range and then detect the peak signal to obtain true proportional control. It can be seen from inspection of FIG. 1, that if the aircraft at point 10 has a flight path vector as indicated at 12, in order to clear obstacle 16 by a distance $H_o$, a change of the flight path equal to the terrain angle indicated at C is required. It will be noted that this angle is greater than the terrain angle to an obstacle 17 despite the fact that the latter is higher than obstacle 16. This is so, of course, due to the fact that obstacle 17 is at a greater range. The angle C is the angular subtent of the individual terrain feature which is to be cleared at the clearance distance $H_o$. Thus, it is necessary implicitly or explicitly to compute the obstacle altitude $H - H_o$ for each point within the antenna beam width and from this distance to compute the angular subtent of each such point. Subsequently, the maximum value of each such computed angular subtent is determined and utilized for the desired control.

From another point of view, it can be seen that required climb angle to clear a given height is inversely proportional to range so that if the video height wave form is weighted by an inverse function of range, the resulting elevation steering signal will be such as to cause the aircraft to clear the most dangerous obstacle whether it is at short or long range. The actual mechanization of the altitude control system is therefore made to depend upon angles only since the weighting by the inverse function of range effectively removes the range dependency.

Figure 2:
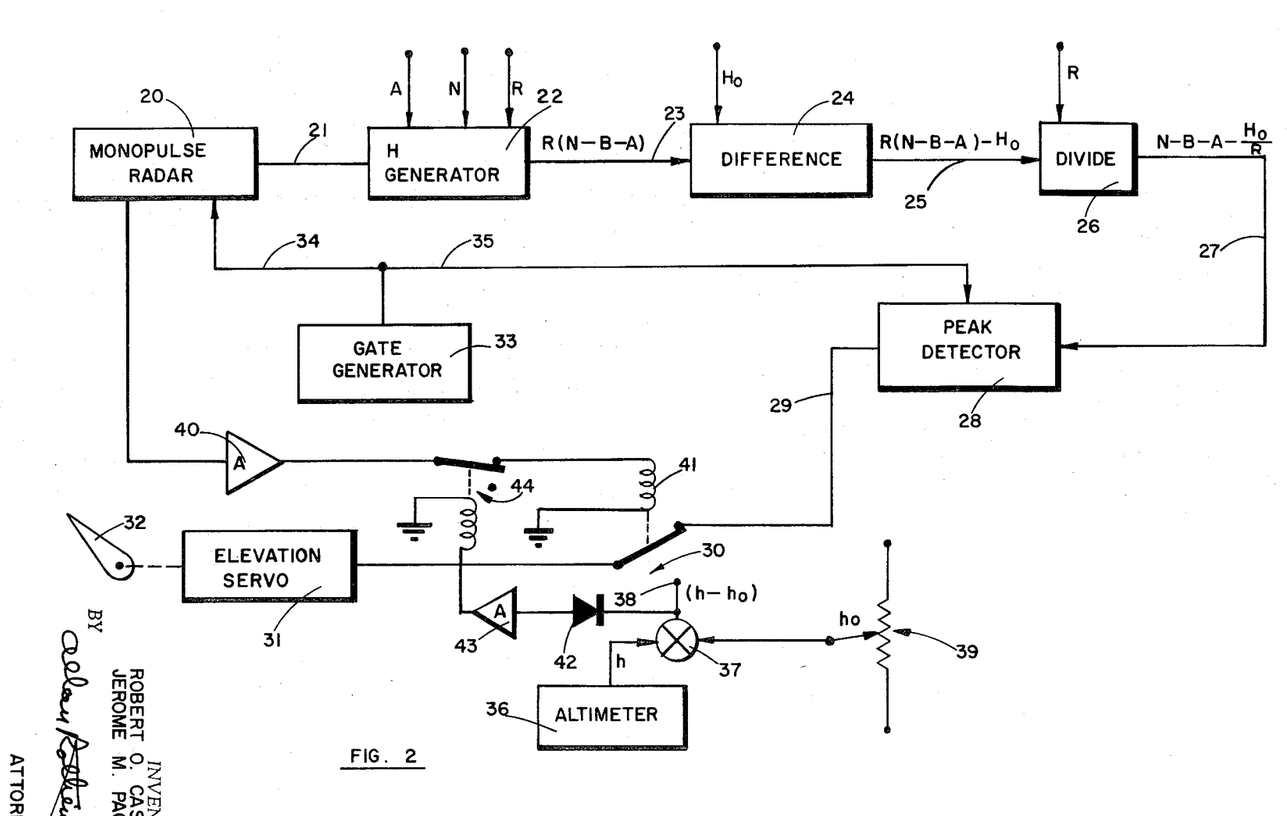
FIG. 2 is a block diagram of one form of the invention.

Referring now to FIG. 2, a monopulse radar 20 which may be of the type described in the aforementioned copending application of W. L. Mitchell, provides on an output lead 21, a signal proportional to the angle B. This signal is fed to a clearance distance or H generator 22 which also receives signals proportional to the antenna depression angle N, the range to the reflecting target R, and angle of attack A. The generator 22 operates upon the inputs thereto to compute the quantity $R(N - B - A)$ appearing upon output lead 23 thereof. This signal on lead 23 thus represents the clearance distance or measured clearance distance H. The signal from generator 22 is fed to a difference network 24 which also receives as an input thereto a signal proportional to the predetermined clearance distance $H_o$. The difference network 24, therefore, produces on its output lead 25 a signal proportional to the quantity $R(N - B - A) - H_o$. This signal is fed to a dividing circuit 26 having an input proportional to the range to the reflecting point on the terrain and which operates upon the inputs thereto to produce as its output on lead 27 the quantity $(N - B - A) - (H_o/R)$. This quantity (as more specifically explained below) is proportional to the angular subtent signal or terrain angle and represents the range weighted danger signal. The range weighted danger signal on lead 27 is fed to a peak detector 28 which produces as its output on lead 29 a signal proportional to the maximum value of the range weighted danger signal. The maximum danger signal on lead 29 is then fed through switch 30 to an elevation servo 31 which operates the aircraft pitch control mechanism 32.

The linear characteristic in the measurement of B by a monopulse system is limited to small angles on either side of the boresight axis. However, over certain areas, strong ground reflection signals may be received which are considerably outside this linear portion of antenna beam width. Therefore, a gating system is used to limit the activation of the aircraft control system to those signals which lie within the linear portion of the antenna beam width. Because of the known geometry of the aircraft and antenna radiation pattern, it is possible to pre-select maximum and minimum ranges over which control is possible, and therefore, to generate a gate for the receiving system and the peak detector. To this end there is provided a gate generator 33 which produces an enabling gate on leads 34 and 35 which is initiated at a point in time corresponding to a predetermined minimum range and terminated at a point in time corresponding to a predetermined maximum range. The enabling gating signals on leads 34 and 35 are fed to the radar receiving circuit and to the peak detector respectively which thus can operate solely in the presence of the enabling range gate.

In the event the radar sum video is lost (as could happen if the aircraft flew over smooth water) the switching circuit 30 is operated to cause the autopilot to revert to control from a radar or pressure altimeter 36 which may be of the type more particularly disclosed in the aforementioned patents to Ward and Hunter. This altimeter 36 produces a signal $h$ proportional to the distance between the aircraft and the ground immediately beneath the aircraft which is fed as one input to a comparator or difference circuit 37. From an adjustable source, such as potentiometer 39, there is provided a signal $h_o$ proportional to the desired clearance distance as measured vertically and this signal is subtracted in comparator 37 from the altimeter measured signal $h$. The difference is fed to terminal 38 of the switch 30. A normally non-conducting amplifier 40 has an input from the sum channel of the monopulse receivers which is operative to cause the amplifier 40 to conduct. Thus, when sum video is lost, amplifier 40 is cut off to de-energize a relay coil 41 which after a suitable delay will release the arm of switch 30 to couple the altimeter signal from comparator 37 to the elevation control mechanism. In the presence of an adequate sum video signal amplifier 40 conducts to maintain coil 41 energized whereby the switch 30 remains in the position illustrated. As a precaution against failure of the radar proportional control, an over-riding control by the altimeter is provided. When the quantity $(h - h_o)$ is negative actual clearance is less than desired clearance. Thus, a negative signal at the output of comparator 37 is fed through a diode 42 and amplifier 43 to operate a switch 44. The latter, when operated, effects de-energization of relay coil 41 to release switch 30 and place the altimeter in control.

Figure 3:
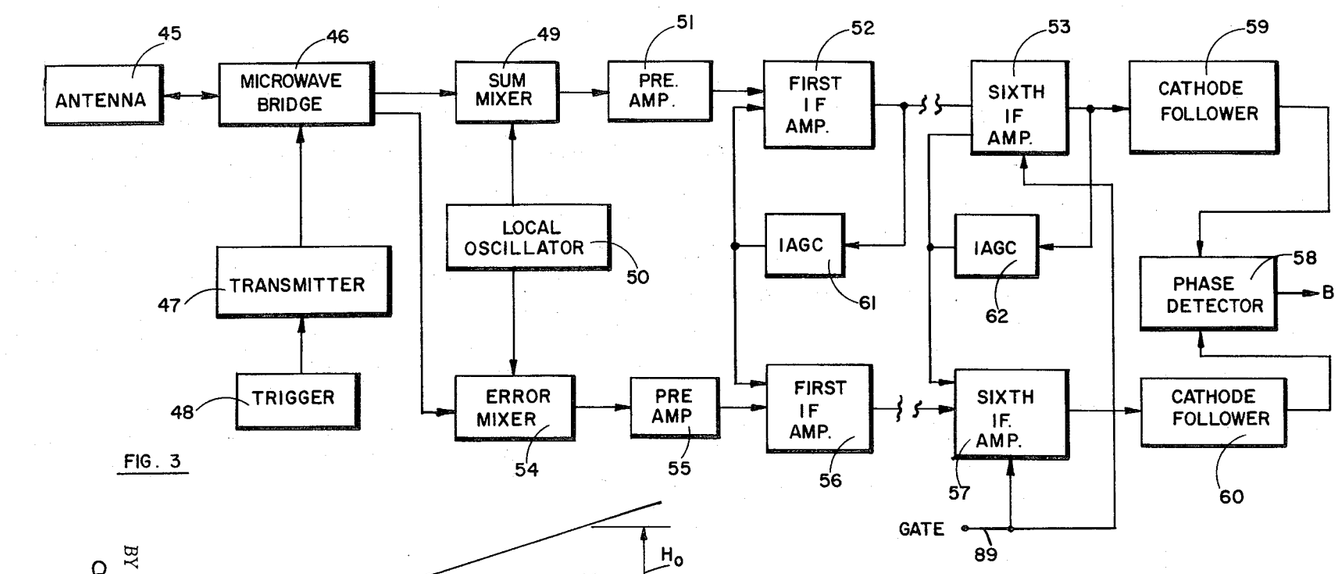
FIG. 3 is a block diagram of a monopulse radar system capable of use with the present invention and having the function of producing a signal precisely proportional to the error angle B.

Illustrated in FIG. 3 is a monopulse radar system of the type more particularly disclosed in the aforesaid application of W. L. Mitchell. An antenna 45 is energized via microwave bridging 46 from a transmitter 47 under the control of a system trigger 48 to radiate pulses of energy in a suitable frequency band. The antenna is of the type having a multi-lobe radiation pattern and receives pulse echos for transmission through the microwave bridge 46 to the sum and difference channels of the monopulse receiver.

The receiver sum channel comprises a sum mixer 49 having a first input from a local oscillator 50 and a second input from the antenna 45 via the micro-wave bridge 46 in a form of additively combined energy from the two lobes of the radiation pattern of the antenna. While for the purposes of this invention, the antenna beam need provide but two lobes symmetrical about the antenna center line and mutually angulated in elevation, it will be readily appreciated that the system may utilize an antenna which additionally provides a pair of azimuth or horizontal lobes for use in conjunction with a second difference (azimuth) receiver channel, not shown, as will be understood by those skilled in the art.

The output of sum mixer 49 is fed through pre-amplifier 51 and then through a plurality of intermediate frequency amplifier stages of which the first, 52, and last, 53, are illustrated. Of course, any suitable number of IF stages may be provided.

The elevation difference channel of the receiver comprises a difference channel mixer 54 having a first input from the local oscillator 50, and a second input from the antenna via the mixro-wave bridge in the form of differentially combined pulse echos received in the two antenna lobes. The output of the error mixer 54 is fed through a pre-amplifier 55 to the intermediate frequency difference channal amplifiers of which those designated as 56 and 57 are illustrated. The two receiver channels are symmetrical whereby there is provided the same number of IF amplifier stages in each.

Because the error signal output of the antenna must be given an algebraic sense it is necessary to detect the sense or phase of the error signal with respect to that of the sum signal. To this end there is provided the phase detector 58 which receives the sum channel signal $E_s$ from the last sum IF amplifier 53 via a cathode follower 59. The error channel signal from the last IF amplifier 57 is fed via a cathode follower 60 as a second input to the conventional phase detector 58 which provides as its output a signal having a magnitude proportional to the magnitude of the error channel signal, and having a polarity in accordance with the relative phases of the two inputs thereto.

It can be shown for a limited angular region near the boresight axis of the antenna that the error signal $E_d$ is linearly related to the angle off the boresight axis B as follows:

$$E_d = K_1 B E_s$$

(1)

If the sum signal $E_s$ is controlled in such a manner that it is independent of received signal strength it can be assumed constant, resulting in an output of the phase detector which is a direct measure of B, that is $E_d = KB$. The sum signal is made essentially independent of the received signal strength by controlling the gain of the IF amplifier stages as a function of received signal strength particularly described in the aforesaid application of W. L. Mitchell. The gain control is achieved as illustrated in FIG. 3, by means individual to each stage. Thus, an IAGC control 61 is provided for the first IF stage which has an input from the first sum channel IF stage 52, and has an output for controlling the gain of the first stage in both sum and error channels. Similarly, for the last IF stage, gain control is provided for by the circuit 62 having an input from the corresponding sum channel IF stage 53 to provide gain control for both the sum and error stages 53 and 57. Thus, the gain control voltage for each stage is derived independently and fed back around each stage of the IF sum amplifier. Each corresponding stage of the IF error amplifier is controlled open-loop by the gain control voltage from the sum IF amplifier. In this way, a very rapid gain control response can be achieved to obtain precise linearity of the output of the phase detector 58.

Figure 4:
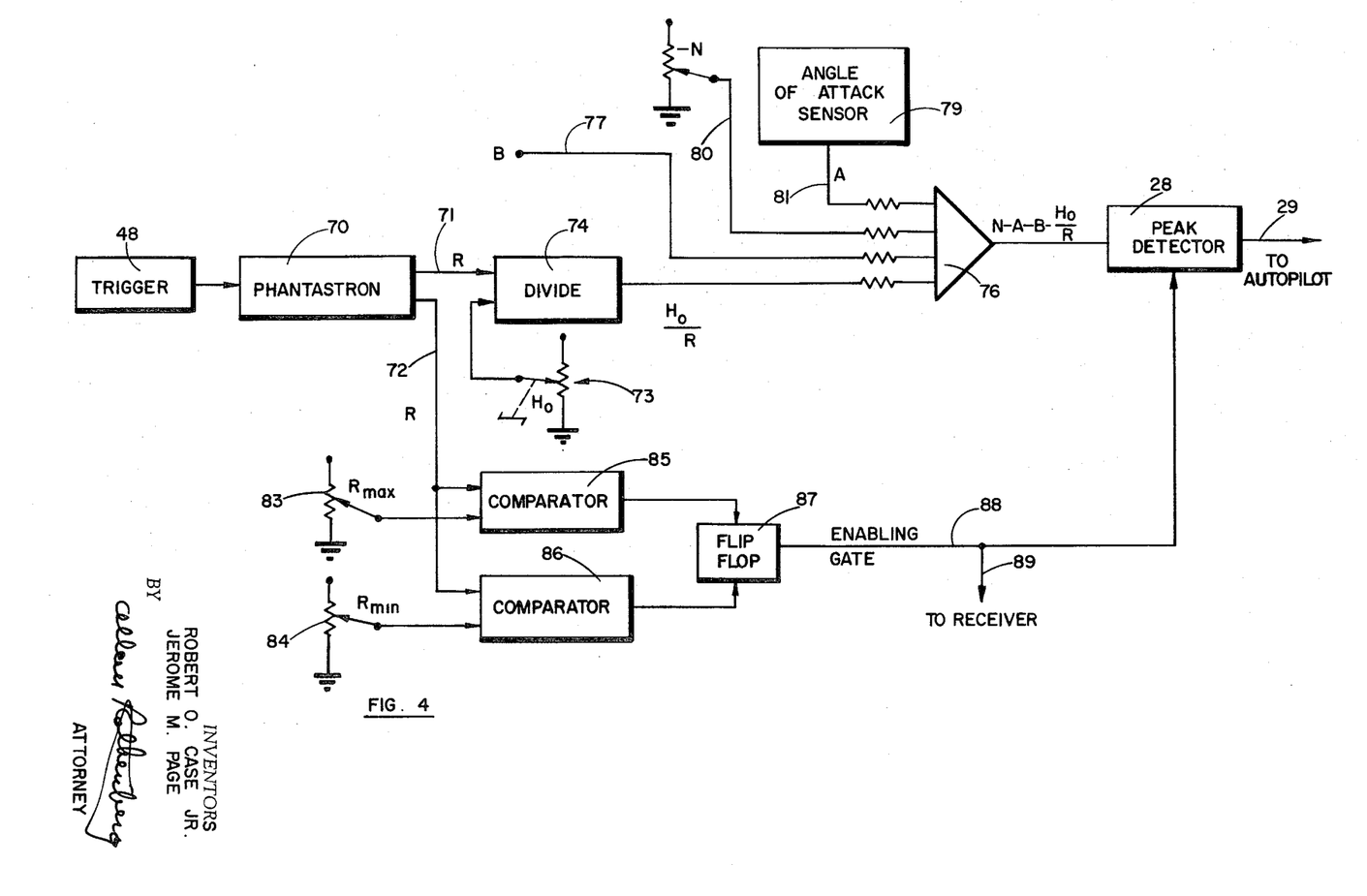
FIG. 4 is a block diagram of the computer which is utilized with the monopulse radar of FIG. 3.

The computer arranged for operation together with the radar system of FIG. 3 achieves an implicit computation and solution of the problem which is explicity achieved by the computer of FIG. 2. The equation solved by the computer of FIG. 4 is derived with reference to the geometry illustrated in FIG. 1.

As illustrated in FIG. 1, the angle G between the line of sight to a particular reflecting point 16 and the flight path 12 is defined as: $G = N - B - A$, and the distance H between the obstacle 16 and the flight path 12 is defined as $$H = RG = R(N - B - A)$$

(2)

The distance $\Delta H$ by which the obstacle protrudes above the clearance plane is given by $$\Delta H = H - H_0$$

(3)

Weighting this quantity $\Delta H$ inversely with range results in $$\epsilon = (H - H_0)/R = N - B - A - (H_0/R)$$

(4)

The quantity $\epsilon$ thus represents the terrain angle, or the angular subtent C of the reflecting point 16 on the ground. More particularly it will be seen that $$\tan C = [R(N - B - A) - H_0]/R\cos(N - B - A)$$

(5)

For the small angles existing in this situation this becomes $$C = [R(N - B - A) - H_0]/R = \epsilon$$

(6)

whereby it will be seen that the angular subtent angle C is equal to the quantity $\epsilon$.

A signal representing $\epsilon$ is then to be peak detected, such that the largest value of this time varying function (varying for each point on the terrain within the beam pattern) will represent the most dangerous obstacle and the angle thereof. If this angle is not zero, a steering command is supplied to the aircraft autopilot. To assure that the information supplied to the autopilot is a true measure of the control signal $\epsilon$, the receiving system and the output of the peak detector are gated to limit the information gathering intervals to the linear portion of the monopulse elevation antenna characteristics. This is required, since as previously described, the relationship between $E_s$ and $E_d$ is linear only near the boresight axis of the antenna.

The computer illustrated in FIG. 4 is utilized to solve for $\epsilon$ in accordance with equations 4 and 6. The displacement of the terrain relative to the airplane is computed implicitly in the same way as in the co-pending application of W. L. Mitchell, namely, by multiplying angle off boresight plus antenna depression angle plus angle of attack by range. From this quantity the clearance plane setting is subtracted. The result is the distance by which the terrain protrudes above the clearance plane. This distance is divided again implicitly by range to obtain a weighted danger signal. This signal is produced at a video rate. That is, after each transmitted pulse, the signal that is produced as a function of time is representative of the danger of all elements of the terrain within the antenna beam pattern as a function of range. The video thus processed is passed through a peak detector. The output of the peak detector results in a signal representative of the most dangerous obstacle. Another way of interpreting the significance of the peak detector output is to note that it represents the angular subtent of the most dangerous obstacle relative to the clearance plane, and therefore, represents the angle through which the velocity vector must rotate in the elevation plane in order that the obstacle will be cleared by a distance equal to the clearance plane setting. The signal is then sent to the auto-pilot as either a pitch rate command, as illustrated, or as a normal acceleration command.

A range generator such as the phantastron 70 is controlled by the system trigger from trigger circuit 48 of FIG. 3 to produce at output leads 71 and 72 a range signal proportional to the quantity R. The desired clearance plane distance $H_O$ is pre-set by a potentiometer 73 under manual control which feeds a signal $H_o$ to a divider 74. A second input to divider 74 is in the form of a range signal from the range generator 70. The divider provides as its output on lead 75 the ratio of the two inputs thereto. This signal is fed as one input to a summing amplifier 76.

The output of the phase detector 58 of FIG. 3 is bipolar video and represents the angle B explicitly. The amplitude of the video is a measure of the angle of return of the received signal off the antenna boresight axis. The polarity indicates the direction of the angle, above or below the boresight axis. This angle B is fed via lead 77 as a second input to the summing amplifier 76. A third input N to amplifier 76 is provided by a potentiometer 78 which is adjusted in accordance with the antenna depression angle N. Where stabilization and computation with reference to the flight path of the aircraft is desired, there is provided an angle of attack sensor 79 which produces the angle of attack signal A on lead 81, which is fed as the fourth input to the summing amplifier 76.

Thus, the output of the amplifier 76 is proportional to the quantity $$N - A - B - (H_o/R).$$

The output of the summing amplifier 76 is fed as previously described in connection with the computer of FIG. 2 to a peak detector 28 which tus provides at its output 29 a signal to the autopilot precisely proportional to the angular subtent of the most dangerous obstacle.

For the purposes of gating the elevation control of the aircraft to the linear portion of the antenna error pattern, there are provided a pair of potentiometers 83 and 84 which are set to yield signals proportional to predetermined values of maximum and minimum slant range respectively. These signals are compared in comparators 85 and 86 respectively, with the range signals on lead 72 from the range generator 70. Comparator 85 produces a relatively sharp pulse at a point in time indicative of a measured range equal to the pre-set maximum range, and comparator 86 produces a relatively sharp pulse at a point in time when the measured range is equal to the pre-set minimum range. These output pulses of comparators 85 and 86 are fed to a conventional flip-flop or bi-stable multi-vibrator 87 so that the minimum range pulse from comparator 86 will set the flip-flop into one state and the maximum range pulse will reset the flip-flop into its other state. Thus, the output of the flip-flop comprises an enabling gate in the form of a square wave which is initiated at the minimum range and which is terminated at the maximim range. The enabling gate on lead 88 at the output of flip-flop 87 is fed via lead 89 to the sum and error receiver channels as indicated in FIG. 3 and is also fed to enable the peak detector 28.

It will be seen there has been described a concept and mechanizations of a relatively simple radar system which provides a precise and reliable automatic elevation control of a low-flying aircraft which is particularly characterized in that it determines the angular subtent of the most dangerous obstacle relative to a preselected clearance plane to provide elevation control of the trajectory of a low-flying vehicle.

While the specifically described systems utilize a weighting factor which is a linear function of range, it will be readily appreciated that other weighting schemes may be employed within the concept of this invention. For example, a variable weighting may be achieved by utilizing a weighting factor which is a non-linear function of range. So, too, weighting may be accomplished by effecting a tilt of the clearance plane so as to require less clearance at longer ranges. Such tilt of the clearance plane may be achieved by simply adding a constant to the error signal output from the peak detector or by adding a constant to the signal N representing antenna depression angle.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an airborne radar having a forward looking antenna directed toward the ground at a relatively small depression angle,
   means including said antenna for generating first and second signals indicative of the range and direction respectively of terrain lying within the beamwidth of the antenna;
   means responsive to said radar for generating a reference signal indicative of a preselected clearance distance, Ho, divided by said range, R;
   signal combining means responsive to said second signal and said reference signal for providing a warning signal indicative of the difference therebetween.

2. In an airborne radar having a forward looking antenna directed toward the ground at a relatively small depression angle,
   means including said antenna for generating first and second signals indicative of the range and direction respectively of terrain lying within the beamwidth of the antenna;
   means responsive to said radar for generating a reference signal indicative of a preselected clearance distance, Ho, divided by said range, R;
   signal summing means responsive to said first and second mentioned means; and
   peak detection means responsive to said signal summing means for providing a maximum value terrain warning signal indicative of a required maneuver angle, C.

3. The device of claim 2 in which said second mentioned means is comprised of
   a signal bias generator for generating a signal indicative of a preselected clearance distance, Ho; and
   a signal divider responsive to said range signals and to said bias generator for providing a signal indicative of the ratio of said preselected clearance distance divided by said range.

4. The device of claim 2 in which is further provided means responsive to said radar for gating on said peak detector during a preselected range interval, said gating means comprising a first gate for gating on said peak detector in response to range signals indicative of a range greater than a preselected minimum range, and a second gate for gating off said peak detector in response to range signals indicative of a range greater than a preselected maximum range.

5. The device of claim 2 in which is further provided
   a signal utilization device,
   means for coupling said peak detector to said signal utilization device,
   an altimeter, and
   switching means responsive to said altimeter means for overriding the coupling of said peak detector to said utilization device.

6. The device of claim 2 in which is further provided:
   signal utilization means,
   altimeter means for providing a signal indicative of an altitude less than a preselected clearance distance.
   first coupling means responsive to said radar for coupling the output of said peak-detector and said signal utilization device during a received output from said radar, and
   second coupling means responsive to said altimeter means for overriding said first coupling means to connect said altimeter means to said signal utilization means during the interval when said altimeter means provides a signal indicative of an altitude less than a preselected clearance distance.

7. Vehicle borne monopulse radar means including an antenna having a multilobe radiation pattern directed towards points on the ground along a boresight axis depressed by a relatively small angle from a selected reference direction and having receiver means for providing an error signal representative of the displacement angle between said boresight axis and the direction to a reflecting point on the ground, means for generating a reference signal representative of the ratio of a predetermined clearance distance to range of said reflecting points, means for generating a depression signal representative of the depression angle of said boresight axis, summing means responsive to said signals for producing a terrain angle signal representative of the difference between said reference signal and said depression and error signals, a peak detector responsive to said terrain angle signal, and output means responsive to said peak detector.

8. Vehicle borne monopulse radar means including an antenna having a multilobe radiation pattern directed towards points on the ground along a boresight axis depressed by a relatively small angle from a selected reference direction and having receiver means for providing an error signal representative of the displacement angle between said boresight axis and the direction to a reflecting point on the ground, means for generating a reference signal representative of the ratio of a predetermined clearance distance to range of said reflecting points, means for generating a depression signal representative of the depression angle of said boresight axis, means for generating an angle of attack signal representative of the angle of attack of said aircraft, summing means responsive to said signals for producing a terrain angle signal representative of the difference between said reference signal and said depression, error and angle of attack signals, a peak detector responsive to said terrain angle signal, maximum and minimum range generators, a gate generator responsive to said range generators, an enabling connection from said gate generator to said peak detector and to said receiving means, and output means responsive to said peak detector.

9. In combination with an aircraft, an antenna on said aircraft having a boresight axis and a pair of radiation lobes extending on either side of said axis, said axis being depressed through a small angle relative to a reference line on said aircraft, microwave means for additively and subtractively combining energy received by said antenna to produce sum and error signals respectively, sum and error receiver channels respectively responsive to said sum and error signals, instantaneous automatic gain control means responsive to signals in said sum channel for controlling the gain of both said channels, a phase detector having inputs from said sum and error receiver channels and having an output indicative of the angle between said boresight axis and reflecting points on the ground within said radiation lobes, a range generator, a clearance distance reference generator, a divider having inputs from said range and reference generators and having an output indicative of the ratio of clearance distance to range, a depression angle generator having an output indicative of the depression angle of said boresight axis, a summing device having inputs from said depression angle generator and said phase detector and said divider and having an output indicative of the difference between said depression angle and the sum of said divider and phase detector outputs, a peak detector having an input from said summing device, maximum and minimum range generators, a first comparator having inputs from said range generator and said minimum range generator, a second comparator having inputs from said range generator and said maximum range generator, a gate generator having a gate initiating input from said first comparator and a gate terminating input from said second compartor, an enabling gating connection from said gate generator to said receiver channels and to said peak detector, and an aircraft elevation control device having an input from said peak detector.

* * * * *